United States Patent
Tan et al.

(10) Patent No.: US 10,144,480 B2
(45) Date of Patent: Dec. 4, 2018

(54) ELECTRIC SCOOTER

(71) Applicant: Changsha Mantour Technology Co., Ltd., Changsha, Hunan (CN)

(72) Inventors: Xiaotian Tan, Hunan (CN); Jianyu Huang, Hunan (CN); Liang Tang, Hunan (CN)

(73) Assignee: Changsha Mantour Technology Co., Ltd., Changsha (CN)

( * ) Notice: Subject to any disclaimer, the term of this patent is extended or adjusted under 35 U.S.C. 154(b) by 0 days.

(21) Appl. No.: 15/412,047

(22) Filed: Jan. 22, 2017

(65) Prior Publication Data

US 2018/0208264 A1 Jul. 26, 2018

(51) Int. Cl.
*B62K 15/00* (2006.01)
*B62M 7/12* (2006.01)
*B62K 21/16* (2006.01)
*B62L 1/04* (2006.01)

(52) U.S. Cl.
CPC ............ *B62K 15/006* (2013.01); *B62K 21/16* (2013.01); *B62L 1/04* (2013.01); *B62M 7/12* (2013.01); *B62K 2202/00* (2013.01); *B62K 2204/00* (2013.01); *B62K 2208/00* (2013.01)

(58) Field of Classification Search
CPC .. B62K 15/006; B62K 21/16; B62K 2204/00; B62K 2208/00; B62K 2202/00; B62M 7/12; B62L 1/04
See application file for complete search history.

(56) References Cited

U.S. PATENT DOCUMENTS

| | | | | |
|---|---|---|---|---|
| 5,848,660 | A * | 12/1998 | McGreen | B62K 3/002 180/208 |
| 8,322,478 | B2 * | 12/2012 | Kim | B62K 11/007 180/218 |
| 9,302,728 | B1 * | 4/2016 | Yang | B62K 15/006 |
| 9,376,158 | B1 * | 6/2016 | McCormick | B62K 15/006 |
| 2002/0109314 | A1 * | 8/2002 | Chen | B62B 13/04 280/14.28 |
| 2010/0065361 | A1 * | 3/2010 | Nam | B60W 30/04 180/211 |
| 2012/0192784 | A1 * | 8/2012 | Gimlan | H02K 7/025 116/200 |
| 2013/0307240 | A1 * | 11/2013 | Petutschnig | B62K 3/002 280/87.042 |
| 2014/0008138 | A1 * | 1/2014 | Kim | B60L 11/1877 180/216 |

(Continued)

*Primary Examiner* — Darlene P Condra (57) ABSTRACT

The present invention discloses an electric scooter. The electric scooter comprises a body substrate, a support rod, a front wheel, a rear wheel and a fold mechanism; the front wheel is an in-wheel motor, the body substrate can fold close to the support rod with the rear wheel by means of the fold mechanism; the support rod is internally provided with a controller which is connected with the in-wheel motor, the front wheel is rotated to trigger the controller, thus the controller controls the in-wheel motor to rotate; the support rod has a retractable rod body, and handlebars are foldable. According to the present invention, the electric scooter cannot only be folded to the greatest extent, which saves a space to the greatest extent after being folded and is easy to carry, it also can be half-folded to facilitate carrying by hands, and can generate a driving assistance to enable the body to slide further as well.

7 Claims, 7 Drawing Sheets

(56) References Cited

U.S. PATENT DOCUMENTS

| | | | |
|---|---|---|---|
| 2014/0090916 A1* | 4/2014 | Lovley, II | B62K 3/002 180/220 |
| 2015/0075888 A1* | 3/2015 | Duncan | B62K 19/46 180/219 |
| 2015/0321722 A1* | 11/2015 | Dadoosh | B62K 3/002 180/208 |
| 2016/0031525 A1* | 2/2016 | Craven | B62J 99/00 180/206.2 |
| 2016/0221629 A1* | 8/2016 | Behar | B62J 1/28 |
| 2016/0233741 A1* | 8/2016 | Kaun | H02K 7/1846 |
| 2017/0001683 A1* | 1/2017 | Gerencser | B60B 9/26 |
| 2017/0190377 A1* | 7/2017 | Ku | B62D 61/04 |
| 2017/0240239 A1* | 8/2017 | Huang | B62K 11/10 |

* cited by examiner

ELECTRIC SCOOTER

TECHNICAL FIELD

The present invention relates to a transport device, and more particularly, to an electric scooter.

BACKGROUND

A scooter is a device which can be used as transport. The commonly used working mode of the current scooter is like that: both hands hold the handles to master a direction, one foot stamps on a pedal of the scooter, and the other foot thrusts against the ground backward to generate a thrust which drives the scooter to slide forward. Such scooter has the disadvantages that the operator moves half in a running state equivalently, and it's easier to get tired and hard to control the body in balance.

Most of the existing scooters or other sport vehicles do not have a folding function or can't be folded conveniently. In order to make the scooter or other sports vehicles more convenient to carry and use when going out, the handlebar support rod of the existing scooter is usually configured as a foldable structure, but it is difficult to be dragged after being folded. Or the handlebar support rod fails to be locked as a direction of the handlebar is perpendicular to that of the body substrate, so after the scooter being folded, the handlebar crosses above the body substrate, and as a result, an entire width of the body substrate is wider after the scooter is folded, which occupies a larger floor area while storing and is inconvenient to carry.

Moreover, according to the existing scooter, the rear wheel is braked by a brake pad, however such braking structure wears tires more.

SUMMARY

Aiming at the shortages of the above prior art, the present invention invents a foldable electric scooter which is convenient to carry and has a longer sliding distance.

According to one aspect, the present invention provides an electric scooter, comprising a body substrate, a support rod, a front wheel, a rear wheel and a fold mechanism, wherein the support rod is connected with one end of the body substrate, the rear wheel is connected with the other end of the body substrate, the front wheel is connected with a lower end of the support rod, and the fold mechanism is located at the junction between the body substrate and the support rod. The support rod is internally provided with a controller which is located at a lower portion of the support rod. The controller is connected with the front wheel, and the front wheel is a front in-wheel motor, thus the front wheel is rotated to trigger the controller, then the controller controls the in-wheel motor to rotate.

For the electric scooter, the body substrate, carrying with the rear wheel, can be folded by means of the fold mechanism to adhere to the support rod, thus it is easy to carry and saves space after being folded. The operator can stamp on the body substrate with one foot and thrust against the ground to drive the scooter to move forward with the other foot. Once the front wheel rotating, it triggers the controller, and then the controller controls the in-wheel motor to rotate continuously, namely, the controller controls the front wheel to rotate continuously. Thus, the body slides forward at a further distance after thrusting against the ground by foot each time, comparing with the prior art.

In some embodiments, the support rod and the ground form a certain angle, which is less than or equal to 90 degrees.

In some embodiments, the support rod and the ground form a certain angle, which is 85 degrees.

In some embodiments, the support rod comprises a first rod body, a second rod body and a third rod body, the second rod body is sheathed on an upper portion of the first rod body, and the first rod body can be perpendicularly moved up and down along the inside of the second rod body, and the third rod body is located at an upper end of the second rod body, which leads to the advantages that the support rod is divided into a structure of three rod bodies, and both the first rod body and the second rod body are vertical rod bodies, which can achieve the extension and retraction of the rod body, so that fold of the body is more convenient and the volume of the body is reduced.

In some embodiments, the fold mechanism comprises a front cushion, a rotary seat, a positioning-clamping hole, a positioning pin and a rotating shaft, the front cushion is connected to the body substrate, the front cushion is provided with a clamping hole, the rotary seat is connected to a lower end of the first rod body, the positioning-clamping hole and the rotating shaft are located on the rotary seat, and the positioning pin penetrates through the positioning-clamping hole and the clamping hole to connect the front cushion and the rotary seat together, wherein two positioning-clamping holes are provided, thus when the body is in a folded state, one of the positioning-clamping holes corresponds to the clamping hole and they are fixed by the positioning pin; when the body is in an unfolding state, the other positioning-clamping hole corresponds to the clamping hole and they are fixed by the positioning pin; and when the body is folded, the rotating shaft is fixed, and the rotary seat is rotated and folded by taking the rotating shaft as a center. Thus, it has the advantages that the fold mechanism facilitates fold of the body substrate, and after being folded, the body substrate and the rear wheel are close to the support rod, so that the volume is reduced, and the space is saved.

In some embodiments, the second rod body is provided with a first through hole and a second through hole, wherein the first through hole is located below the second through hole, and when the body substrate is folded through the fold mechanism, the rear wheel is clamped in the first through hole; while after retracting the support rod by moving the second rod body downward perpendicularly along the first rod body, when the body substrate is folded by means of the fold mechanism, the rear wheel is clamped in the second through hole. Thus, it brings the advantages that when the body substrate is folded by means of the fold mechanism, the rear wheel is clamped in the first through hole, in which way not only fold function is achieved, also the first through hole further plays a role in positioning, so that the second rod body would not fall down by means of being supported by the rear wheel after it is clamped with the first through hole, in this case the scooter is in a half-folded state, in which state the third rod body can be pulled by hands to make the scooter roll forward, thus the space is saved after being folded, and meanwhile it becomes easier to carry. When the second rod body is moved downward perpendicularly along the first rod body to retract the support rod, to fold the body substrate through the fold mechanism, the rear wheel is clamped in the second through hole, so that the scooter is further folded, whereby the volume becomes smaller, and more space is saved.

In some embodiments, a baffle is arranged above the rear wheel, one end of the baffle is connected to the body substrate, and a side of the baffle corresponding to the rear wheel is provided with saw teeth. The saw teeth and the baffle are in an integrated structure, and the baffle is made of an ABS material, while the body substrate is made of a carbon fiber material. It has the advantages that the baffle can play a role in blocking sediments, and the structure of the saw teeth can play a role in braking when the foot stamps on the baffle. Moreover, the material of the saw teeth is not prone to wear the rear wheel, the ABS material and the carbon fiber material ensure the body light and firm, also the materials are cheap, thus the cost is saved and it is much more portable on the basis of ensuring the quality thereof.

In some embodiments, a surface of the body substrate is in a carbon fiber antiskid grinding structure, which has the advantage that an antiskid function is taken when the foot stamps on the body substrate.

In some embodiments, the third rod body is perpendicular to the second rod body, an LED light source is arranged in the middle of the third rod body, and a surface of the LED light source is a light reflecting angle surface. Two ends of the third rod body are configured as handles, and the surfaces of the handles are configured as antiskid layers. A foldable structure is arranged in a junction between the handles and the second rod body, and the handles can be folded downward close to the second rod body. It has the advantages that the LED light source is arranged in the middle of the third rod body, the surface of the LED light source is a light reflecting angle surface which can reflect light, thus the light reflecting angle surface in diffuse reflection makes the area projected by the LED light source larger and causes the light source brighter; the handle can be folded downward to close to the second rod body, which leads to the greatest extent of folding of the scooter, and prevents the handle from protruding outside to generate a resistance and occupy a space.

In some embodiments, after the body is folded to the greatest extent, surface radians of the folded handle, the baffle and the first rod body are consistent and in a streamline, thus the folded body structure is connected tightly. It has the advantages that after the body being folded, the body has no obvious gap, is easier to carry, and has consistent surface radians which make it attractive.

In some embodiments, the third rod body is further provided with a speed regulating button, the speed regulating button is connected with the controller, and the speed regulating button is used for controlling the running speed of the in-wheel motor through the controller. It has the advantages that the sliding speed of the electric scooter is regulated conveniently to make the speed adjustable, so that the electric scooter is safer.

In some embodiments, a gyroscope is arranged inside the controller, which leads to the advantages that the gyroscope can perceive the angle between the body and the horizontal direction to ensure that the body is vertical to the ground all the time in a push-and-pull state.

In some embodiments, the gyroscope is located on the support rod, particularly, can be located on the third rod body, or other parts of the body.

In some embodiment, the electric scooter further comprises a battery, wherein the battery is located inside the first rod body. The battery is connected with the controller, and the controller is connected with the in-wheel motor, thus the battery supplies power for both the controller and the in-wheel motor. The battery can be a lithium ion battery. It has the advantages that the battery can provide an electric energy for assisting the electric scooter, and the lithium oil battery is light, so that the weight of the body is reduced.

Compared with the prior art, the electric scooter according to the present invention is in an attractive structure and has a light body, thus the electric scooter cannot only be folded to the greatest extent, and it also saves a space to the greatest extent after being folded, and it is easy to be carried. And also the scooter can be half-folded to facilitate carrying by hands. Moreover the scooter also can generate a driving assistance to enable the body to slide further.

DETAILED DESCRIPTION

The invention is further described for details with reference to the drawings hereinafter.

FIG. 1 to FIG. 7 schematically show an electric scooter according to one embodiment of the present invention. As shown in FIG. 1 to FIG. 7, the electric scooter comprises a body substrate 1, a support rod 2, a front wheel 3, a rear wheel 4 and a fold mechanism 5.

The support rod 2 is connected to one end of the body substrate 1 at an angle of 85°, the rear wheel 4 is connected to the other end of the body substrate 1, the front wheel 3 is connected to the lower end of the support rod 2, and the fold mechanism 5 is located at a junction between the body substrate 1 and the support rod 2.

The support rod 2 comprises a first rod body 21, a second rod body 22 and a third rod body 23, the second rod body 22 is sheathed on an upper portion of the first rod body 21, and the first rod body 21 can be perpendicularly moved up and down along the inside of the second rod body 22. The third rod body 23 is located at an upper end of the second rod body 22.

The first rod body 21 is internally provided with a controller 211, which is located at a lower portion of the support rod 21. The controller 211 is connected with the front wheel 3 which is an in-wheel motor, thus when the front wheel 3 is rotated, it triggers the controller 211, whereby the controller 211 controls the in-wheel motor to rotate.

The body substrate 1 carried with the rear wheel 4 can be folded by means of the fold mechanism 5 to adhere to the support rod 2, which makes the scooter easy to carry after being folded and also saves space meanwhile. The operator can stamp on the body substrate 1 with one foot, and thrust against the ground to drive the scooter to move forward with the other foot, in this way the front wheel 3 can be driven to rotate to trigger the controller 211, thus the controller 211 controls the in-wheel motor to rotate, and so that the body slides forward at a further distance.

Figure 6:
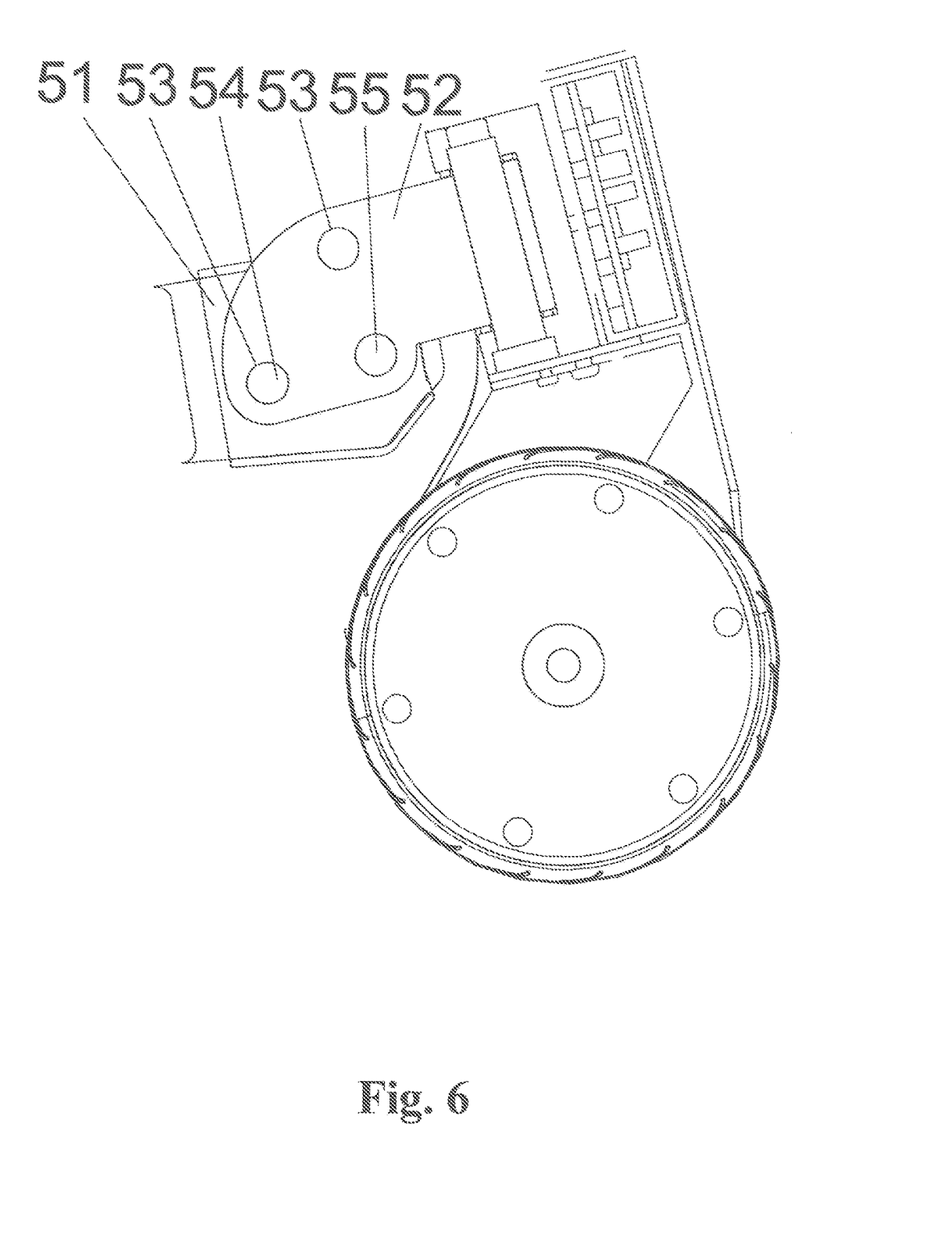
FIG. 6 is a structural schematic diagram of a front wheel portion of the electric scooter according to one embodiment of the present invention.

As shown in FIG. 6, in some embodiments, the fold mechanism 5 comprises a front cushion 51, a rotary seat 52, a positioning-clamping hole 53, a positioning pin 54 and a rotating shaft 55. The front cushion 51 is connected to the body substrate 1, the front cushion 51 is provided with a clamping hole, and the rotary seat 52 is connected to a lower end of the first rod body 21. The positioning-clamping hole 53 and the rotating shaft 55 are located on the rotary seat 52, the positioning pin 54 penetrates through the positioning-clamping hole 53 and the clamping hole to connect the front cushion 51 and the rotary seat 52 together. In this case, two positioning-clamping holes are provided, thus when the body is in a folded state, one of the position-clamping holes 53 is corresponding to the clamping hole and they are fixed by the positioning pin 54; while when the body is in an unfolding state, the other positioning-clamping hole 53 is corresponding to the clamping hole and they are fixed by the positioning pin 54. When the body is folded, the rotating shaft 55 is fixed, and the rotary seat 52 is rotated and folded by taking the rotating shaft 55 as a center. It has the advantages that folding of the body substrate 1 is achieved by means of the folding structure 5, and after being folded the body substrate 1 and the rear wheel 4 are close to the support rod 2, so that the volume is reduced, and the space is saved.

Figure 1:
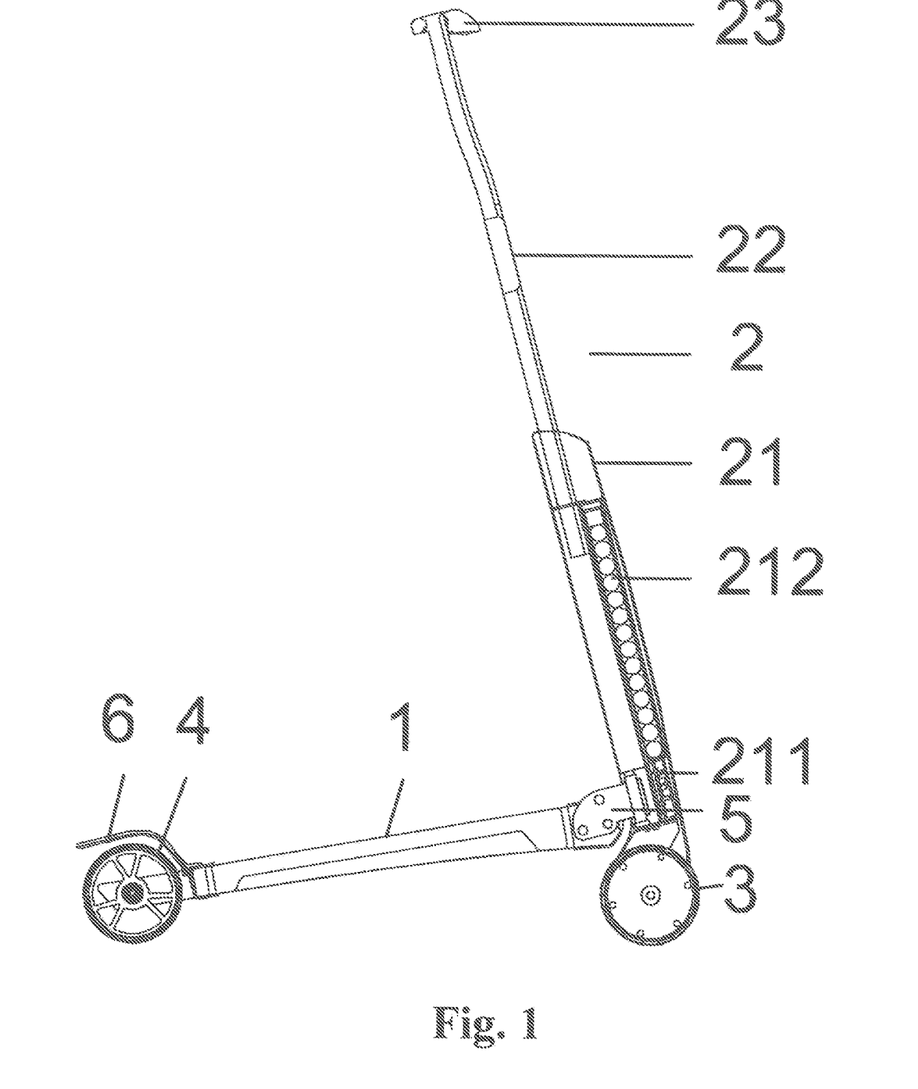
FIG. 1 is a structural schematic diagram of a side surface of an electric scooter in an unfolding state according to one embodiment of the present invention.
Figure 2:
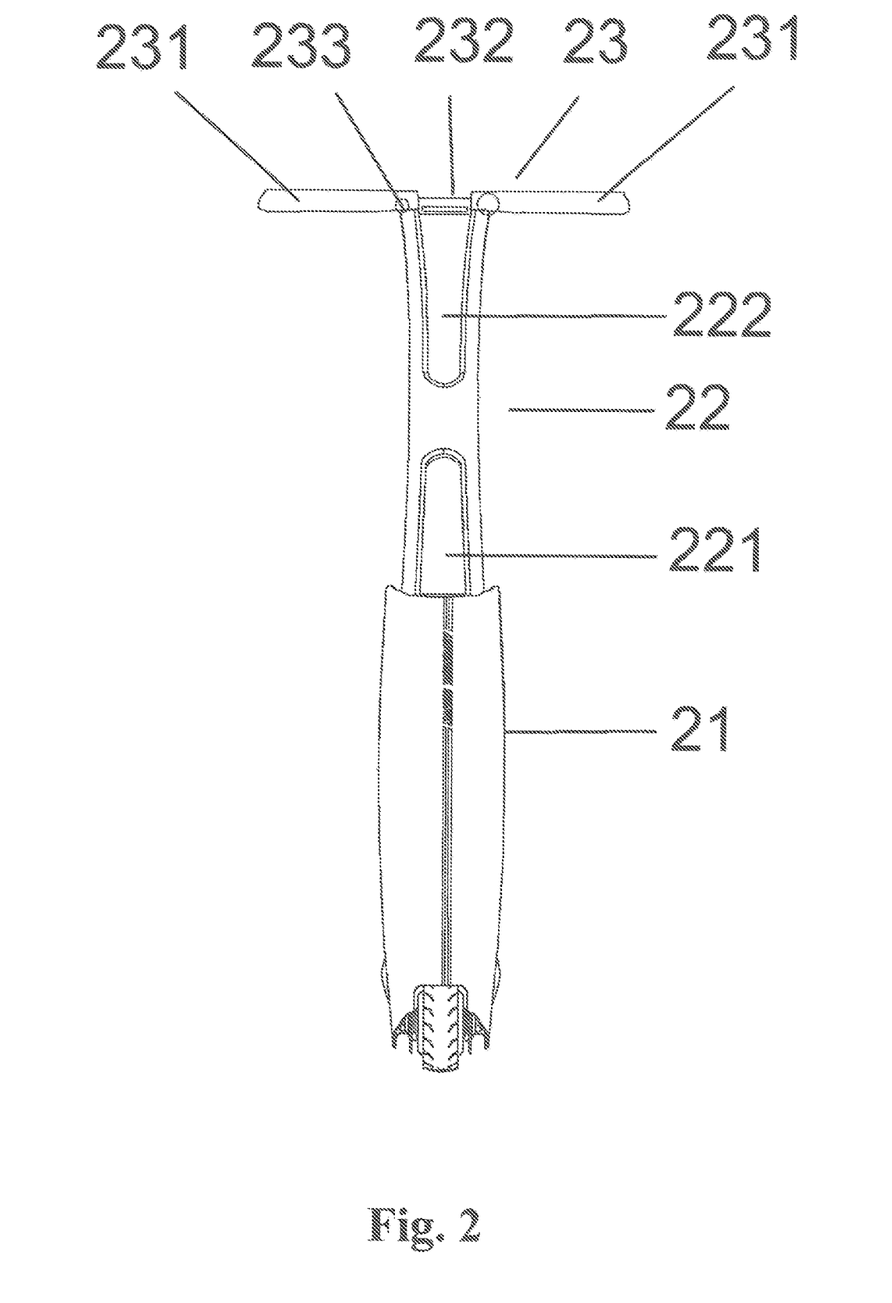
FIG. 2 is a structural schematic diagram of the front of the electric scooter as shown in FIG. 1.

As shown in FIG. 2, the second rod body 22 is provided with a first through hole 221 and a second through hole 222. The first through hole 221 is located below the second through hole 222, the rear wheel 4 is clamped in the first through hole 221 when the body substrate 1 is folded through the fold mechanism 5; after the second rod body 22 is moved downward perpendicularly along the first rod body 21 to retract the support rod 2, and when folding the body substrate 1 by means of the fold mechanism 5, the rear wheel 4 is clamped in the second through hole 222. In some cases, the second rod body 21 is made of a carbon fiber material, which further reduces the weight of the body.

Figure 3:
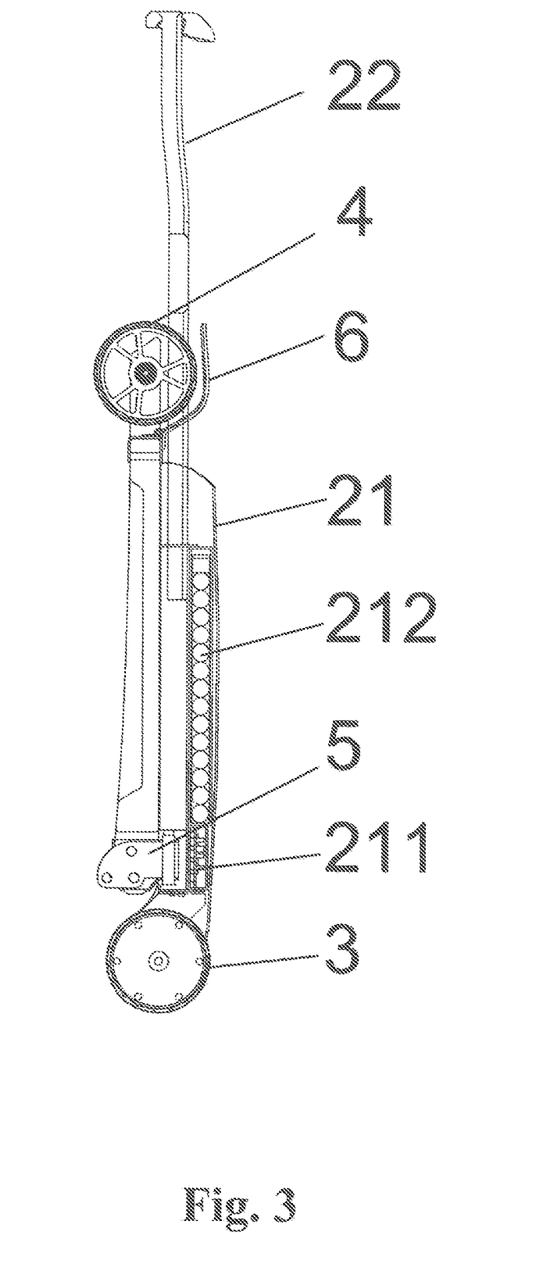
FIG. 3 is a structural schematic diagram of a half-folded electric scooter according to one embodiment of the present invention.

As shown in FIG. 3, when the body substrate 1 is folded through the fold mechanism 5, the rear wheel 4 is clamped in the first through hole 221 to achieve the folding, and the first through hole 221 further plays a role in positioning in this case, so that the second rod body 22 would not fallen down by being supported by the rear wheel 4 after it is clamped with the first through hole 221, and in which case the scooter is in a half-folded state at this moment. The third rod body 23 can be pulled by hands to make the electric scooter roll forward, so that the space is saved and the labor is saved to carry as well after the electric scooter is folded.

Figure 4:
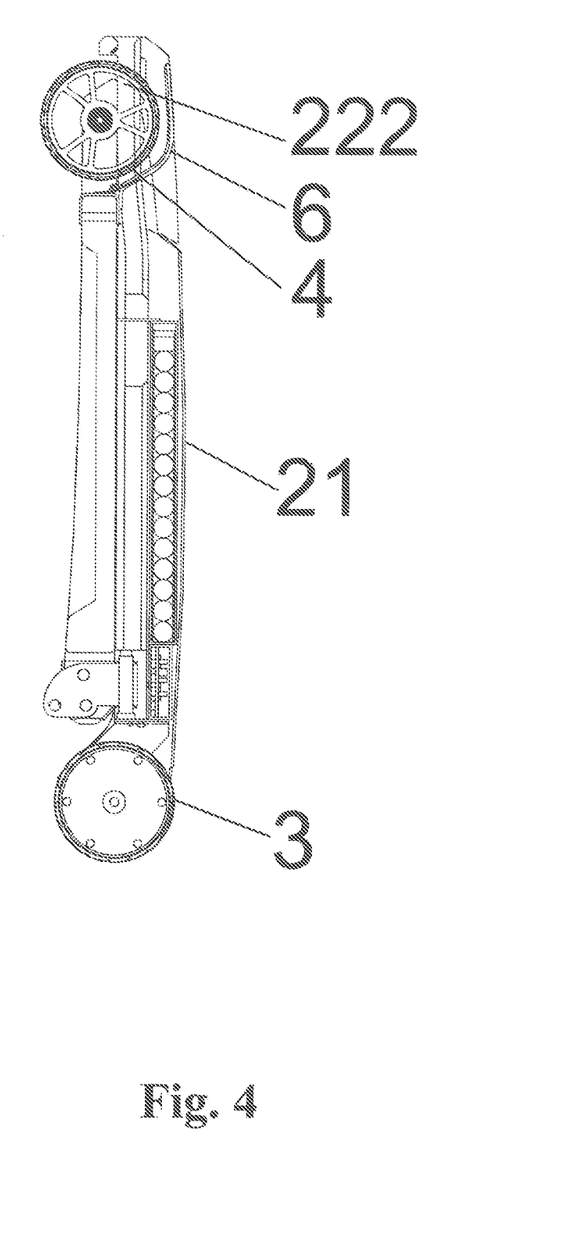
FIG. 4 is a structural schematic diagram of a fully-folded electric scooter according to one embodiment of the present invention.
Figure 7:
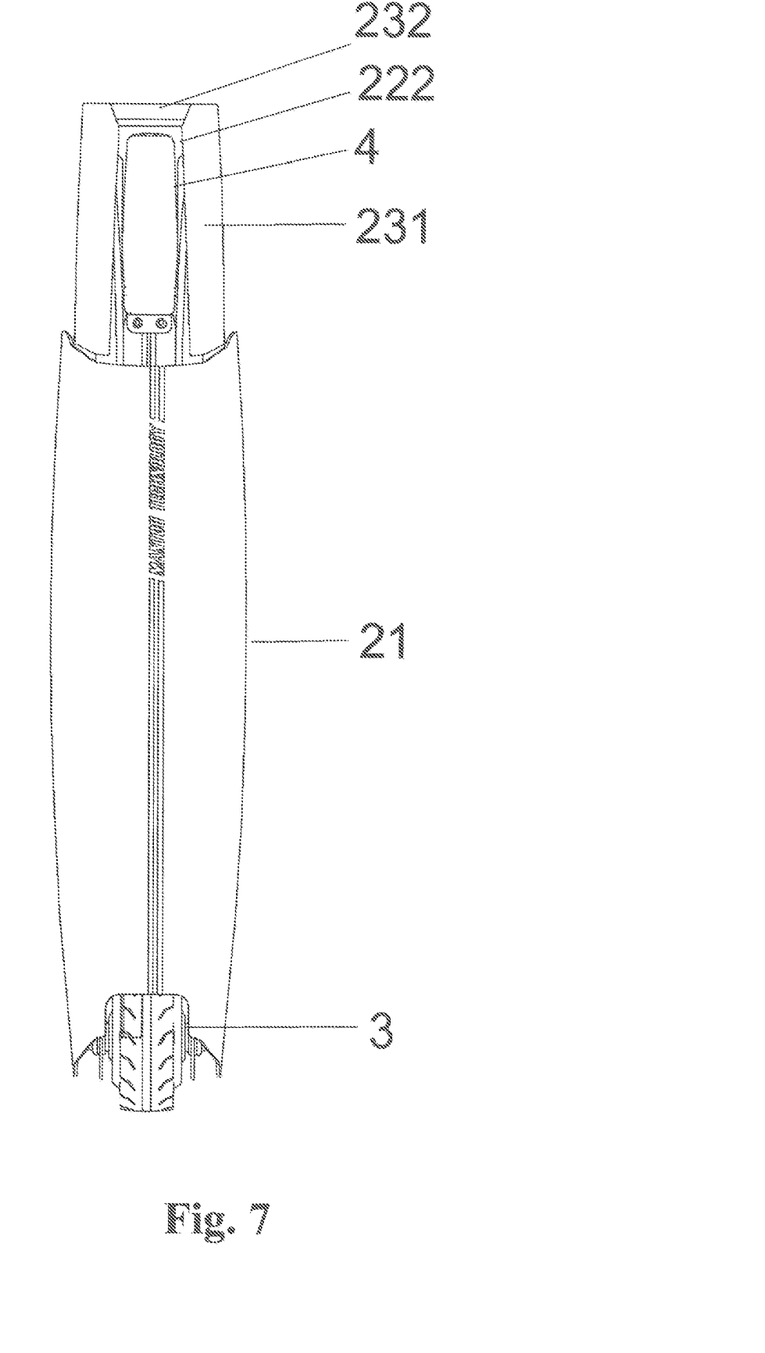
FIG. 7 is a rear view of the fully-folded electric scooter of FIG. 4.

As shown in FIG. 4 and FIG. 7, after the second rod body 22 is moved downward perpendicularly along the first rod body 21 to retract the support rod 2, then when folding the body substrate 1 by means of the fold mechanism 5, the rear wheel 4 is clamped in the second through hole 222 in a fully-folded state at this moment to further fold the electric scooter, so the volume becomes smaller, and much more space is saved.

Figure 5:
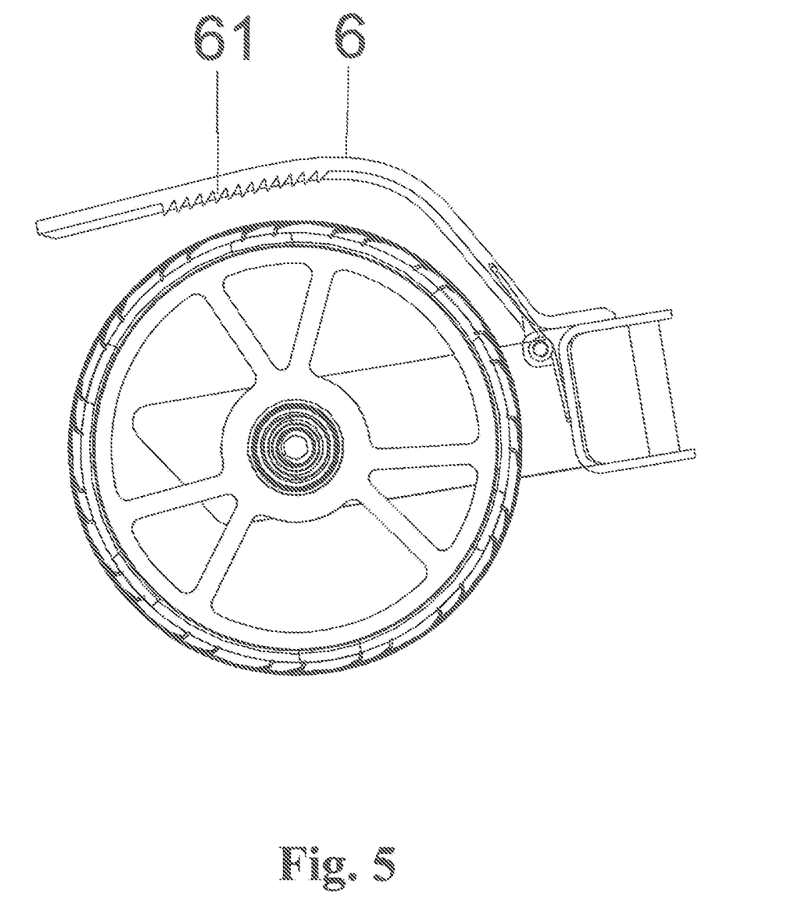
FIG. 5 is a schematic diagram of a rear wheel portion of the electric scooter according to one embodiment of the present invention.

As shown in FIG. 5, a baffle 6 is arranged above the rear wheel 4, one end of the baffle 6 is connected to the body substrate 1, a side of the baffle 6 corresponding to the rear wheel 4 is provided with saw teeth 61, and the saw teeth 61 and the baffle 6 are in an integrated structure. The baffle 6 is made of an ABS material, and the body substrate 1 is made of a carbon fiber material. The baffle 6 can play a role in blocking sediments; the structure of the saw teeth 61 can play a role in braking when the foot stamps on the baffle 6, which is convenient to operate. Moreover, the material of the saw teeth 61 is not prone to wear the rear wheel 4, and the ABS material and the carbon fiber material are cheap and firm, which result in a light body, so that the cost is saved and it is much more portable on the basis of ensuring the quality thereof.

The surface of the body substrate 1 is in a carbon fiber antiskid grinding structure, which plays an antiskid role when the food stamps on the body substrate 1.

The third rod body 23 is perpendicular to the second rod body 22, and an LED light source 232 is arranged in the middle of the third rod body 23. The surface of the LED light source 232 is a light reflecting angle surface, and two ends of the third rod body 23 are configured as handles 231. The surfaces of the handles 231 are antiskid layers. A foldable structure is arranged in a junction between the handles 231 and the second rod body 22, thus the handles 231 can be folded downward close to the second rod body 22. The LED light source 232 is arranged in the middle of the third rod body 23, the surface of the LED light source 232 is a light reflecting angle surface which can reflect the light, the light reflecting angle surface in diffuse reflection makes the area projected through the LED light source larger and makes the light source brighter. As shown in FIG. 7, the handles 231 are articulated with the second rod body 22, so that the handles 231 can be folded downward close to the second rod body 22, which prevents the second rod body 22 from protruding outside to occupy a space.

After the body being folded to the greatest extent, surface radians of the folded handles 231, the baffle 6 and the first rod body 21 are consistent and in a streamline, whereby the folded body structure is connected tightly. Thus, after being folded, the body has no obvious gap, is easier to carry, has consistent surface radians, and is seamless and attractive.

The third rod body 23 is further provided with a speed regulating button 233, which is connected with the controller 211. The speed regulating button 233 is used for controlling the running speed of the in-wheel motor through the controller 211. A sliding speed of the electric scooter is regulated conveniently to ensure the speed adjustable, which makes the electric scooter safer. Accordingly, an appropriate speed can be selected according to the demand of the operator under the normal running state.

A gyroscope is arranged inside the support rod 2. The gyroscope can perceive the angle between the body and the horizontal direction to ensure that the body is vertical to the ground all the time in a push-and-pull state. Thus, when pushing and pulling the scooter forward, the scooter is only applied with a tensile force in a horizontal direction, which saves more labor than that by being pulled in an oblique manner.

The electric scooter further comprises a battery 212, wherein the battery 212 is located inside the first rod body 21. The battery 212 is connected with the controller 211, and the controller 211 is connected with the in-wheel motor, in which way the battery 212 supplies power for both the controller 211 and the in-wheel motor. The battery 212 is a lithium ion battery. The battery 212 can provide an electric energy for assisting the electric scooter, and for the lithium oil battery is light, so that the weight of the body is reduced.

In summary, when the electric scooter according to the present invention is in use, under the normal running state, the operator only needs to select an appropriate speed by adjusting the speed regulating button 233 according to the demand; while under the assist running state, the operator stamps the body substrate 1 with one foot, and thrusts against the ground to drive the scooter to move forward with the other foot, thereby the front wheel 3 is driven to rotate to trigger the controller 211, and the controller 211 controls the in-wheel motor to rotate, so that the body slides forwards at a further distance. When the scooter is not in use, as shown in FIG. 4, the body substrate 1 carried with the rear wheel 4 is folded through the fold mechanism 5 to adhere to the support rod 2, so that the scooter is convenient to carry after reaching a fully-folded state; moreover as shown in FIG. 3, the body substrate 1 is folded through the fold mechanism 5, and the rear wheel 4 is clamped in the first through hole 221, which leads to a half-folded state, and then the third rod body 23 can be pulled by hands to pull the electric scooter to roll forward; moreover, as a result of the act of the gyroscope, the body is always vertical to the ground in a push-and-pull state and is applied with the tensile force along the horizontal direction merely, which saves more labor than that by being pulled in an oblique manner.

The above only describes the preferable embodiments of the present invention. It should be indicated that those skilled in the art may also make various modifications and improvements without departing from the spirit of the present invention, which shall all be deemed within the protection scope of the present invention.

The invention claimed is:

1. An electric scooter, comprising a body substrate (1), a support rod (2), a front wheel (3), a rear wheel (4) and a fold mechanism (5); wherein the support rod (2) is connected to one end of the body substrate (1), the rear wheel (4) is connected to the other end of the body substrate (1), the front wheel (3) is connected to a lower end of the support rod (2), and the fold mechanism (5) is located at the junction where the body substrate (1) and the support rod (2) connects;

the front wheel (3) is an in-wheel motor, and the support rod (2) is internally provided with a controller (211) which is located at a lower portion of the support rod (2) and is connected with the front wheel (3), thus the front wheel (3) is rotated to trigger the controller (211), and the controller (211) controls the in-wheel motor to rotate;

wherein the support rod (2) comprises a first rod body (21), a second rod body (22) and a third rod body (23); the second rod body (22) is sheathed on an upper portion of the first rod body (21), and the first and the second rods can be telescopically moved relative to each other; the third rod body (23) is located at an upper end of the second rod body (22);

wherein the fold mechanism (5) comprises a front cushion (51), a rotary seat (52), a positioning-clamping hole (53), a positioning pin (54) and a rotating shaft (55), the front cushion (51) is connected to the body substrate (1) and is provided with a clamping hole; the rotary seat (52) is connected to a lower end of the first rod body (21), and the positioning-clamping hole (53) and the rotating shaft (55) are located on the rotary seat (52); the positioning pin (54) penetrates through the positioning-clamping hole (53) and the clamping hole to connect the front cushion (51) and the rotary seat (52) together.

2. The electric scooter according to claim 1, wherein the second rod body (22) is provided with a first through hole (221) and a second through hole (222), the first through hole (221) is located below the second through hole (222); the rear wheel (4) is clamped in the first through hole (221) when the body substrate (1) is folded by means of the fold mechanism (5); while after retracting the support rod(2) by moving said second rod body (22) downward telescopically along the first rod body (21), when the body substrate (1) is folded by means of the fold mechanism (5), the rear wheel (4) is clamped in the second through hole (222).

3. The electric scooter according to claim 1, wherein the second rod body (22) is provided with a first through hole (221) and a second through hole (222), the first through hole (221) is located below the second through hole (222); the rear wheel (4) is clamped in the first through hole (221) when the body substrate (1) is folded by means of the fold mechanism (5); while after retracting the support rod(2) by moving said second rod body (22) downward perpendicularly along the first rod body (21), when the body substrate (1) is folded by means of the fold mechanism (5), the rear wheel (4) is clamped in the second through hole (222).

4. The electric scooter according to claim 1, wherein the surface of the body substrate (1) is in a carbon fiber antiskid grinding structure.

5. The electric scooter according to claim 1, wherein the third rod body (23) is perpendicular to the second rod body (22), an LED light source (232) is arranged in the middle of the third rod body (23), and the surface of the LED light source (232) is a light reflecting angle surface; two ends of the third rod body (23) are configured as handles (231), and the surfaces of the handles (231) are provided with antiskid layers; the handles (231) are articulated with the second rod body (22) and can be folded downward close to the second rod body (22).

6. The electric scooter according to claim 1, wherein the third rod body (23) is further provided with a speed regulating button (233), which is connected with the controller (211) and is used for controlling the running speed of the in-wheel motor through the controller (211).

7. The electric scooter according to claim 1, further comprising a battery (212), wherein the battery (212) is located inside the first rod body (21) and is connected with the controller (211); the controller (211) is connected with the in-wheel motor, and the battery (212) supplies power for the controller (211) and the in-wheel motor.

* * * * *